Aug. 4, 1942.   E. P. SACREY   2,291,761
SLAT SLOTTING MACHINE
Filed Oct. 17, 1939   4 Sheets-Sheet 3
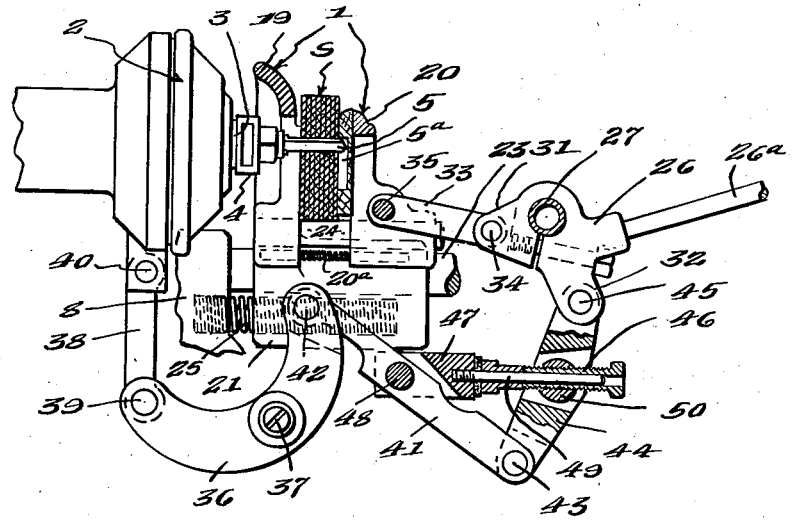
Fig-3-
Fig-4-
INVENTOR.
BY Elmer P. Sacrey
Bradell & Thompson.
ATTORNEYS.

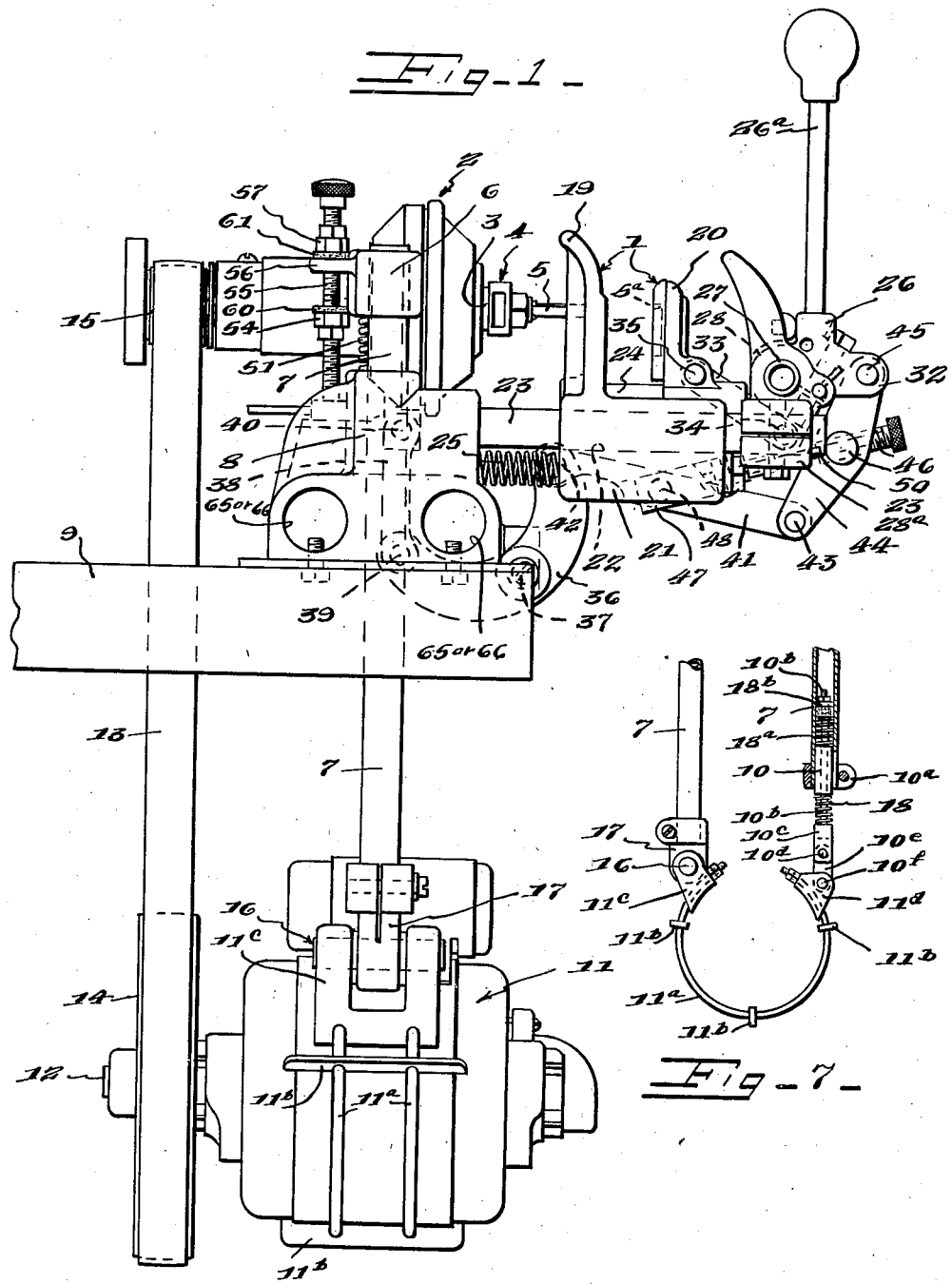

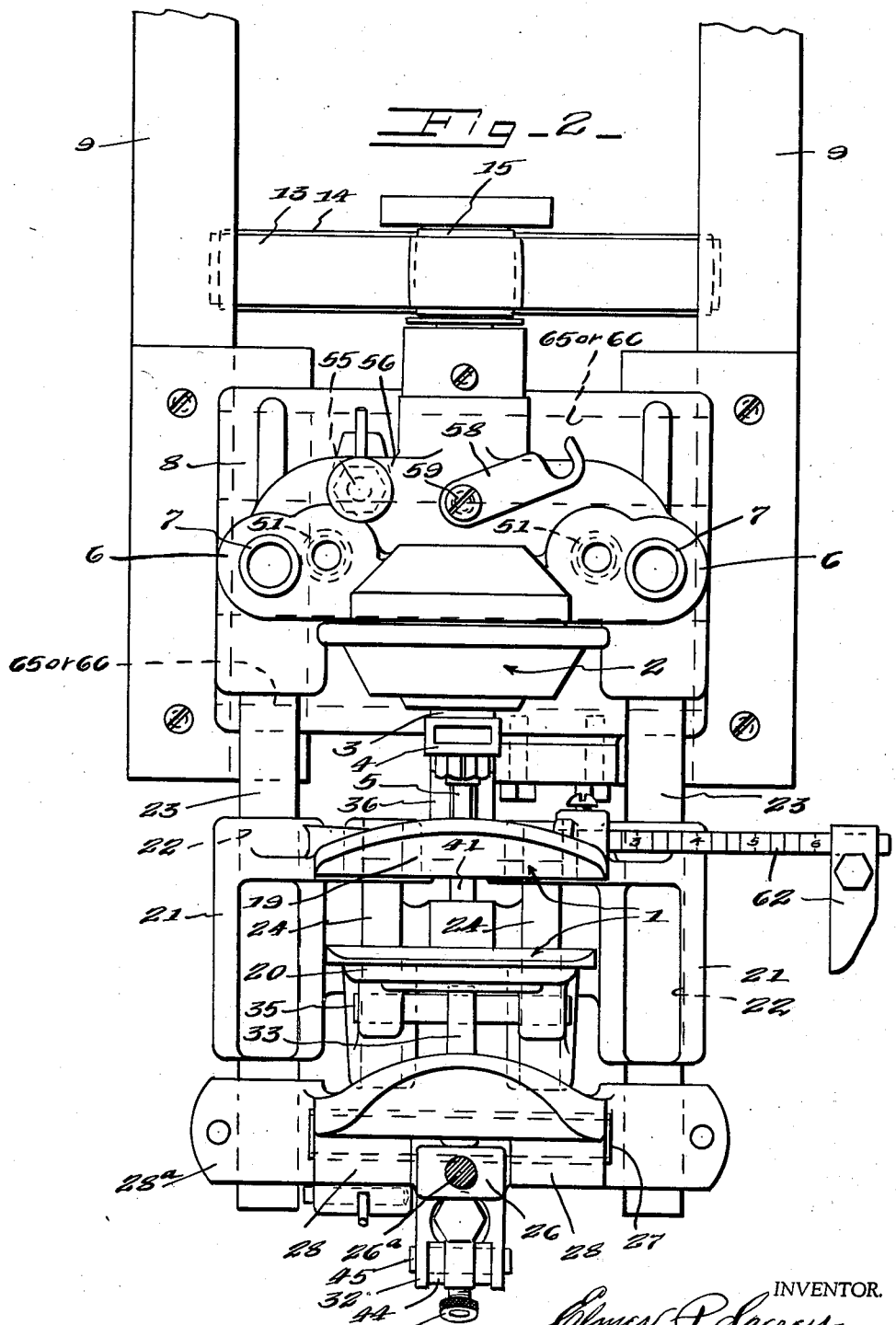

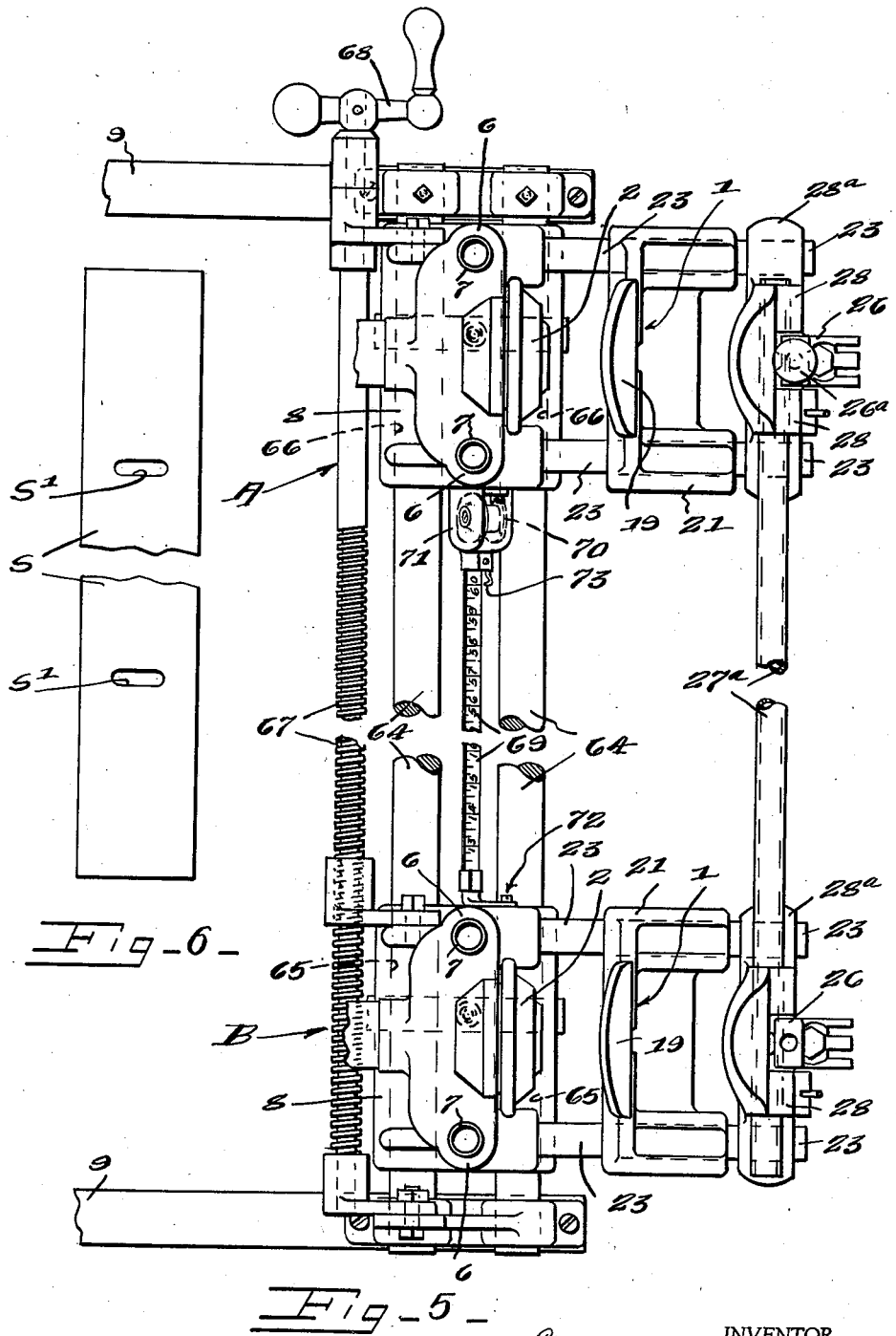

Patented Aug. 4, 1942

2,291,761

UNITED STATES PATENT OFFICE 2,291,761

SLAT SLOTTING MACHINE

Elmer P. Sacrey, Syracuse, N. Y.

Application October 17, 1939, Serial No. 299,856

5 Claims. (Cl. 144—69)

This invention relates to wood-working or slotting machines, and has for its object a machine for forming transverse slots in the end portions of the slats, as the slats of Venetian blinds, by which one or a plurality or bundle of slats may be provided with slots at the same time.

More specifically, it has for its object a slotting machine including mechanism for effecting relative movement of the tool carriage for a rotating cutter and the work or slat carriage in a direction axially of the cutter, in order that the cutter may first bore straight through the slats, and then effect relative movement of the carriages radially relatively to the axis of the cutter to effect the slotting, and also to effect a slight relative reciprocating movement of the cutter and the work carriage during the slotting operation.

The slats are usually varnished and the edges of the coats of varnish act as an abrasive on the tool during the slotting operation and tend to cut circumferential grooves in and hence destroy the tool. The slight reciprocating movement is to keep this abrading action from being localized, and hence prevent grooving of the tool.

The invention further has for its object an operating mechanism including a single handle or control member for effecting the sequence of operations.

The invention further includes a pair of machines coupled together to effect the formation of the slots in the opposite ends of the slats at the same time, one of which machines is adjustable toward and from the other for accommodating slats of different lengths, and a measuring tape carried by one machine and unwinding from a reel thereon and connected to the other machine, so that the operator can, by reading the tape, determine when the machines are separated the proper distance to locate the slots in the slats to be operated on.

The invention consists in the novel features and in the combinations and constructions hereinafter set forth and claimed.

In describing this invention, reference is had to the accompanying drawings in which like characters designate corresponding parts in all the views.

Figure 1 is a side elevation of a machine embodying this invention.

Figure 2 is a plan view.

Figures 3 and 4 are fragmentary views, partly in section, illustrating the working of the operating means.

Figure 5 is a plan view, partly broken away, of a pair of machines coupled together.

Figure 6 is a fragmentary plan view of a slotted slat.

Figure 7 is an elevation, partly in section, of the support for the motor and adjacent parts.

Each slotting machine comprises generally a suitable supporting frame, a carriage for a bundle of slats, a carriage for a rotating cutter, means for rotating the cutter, and means operable to effect:

(a) The clamping of the slats in the slat carriage;

(b) Relative movement of the carriage in a direction axially of the cutter to cause the cutter to bore through the slats;

(c) Relative movement of the carriages in a direction widthwise of the slats or radially relatively to the axis of the cutter to cut the slots; and (d) To effect reciprocation of the slat carriage slightly during the slot cutting operation to avoid cutting grooves in the cutter.

The frame may be of any suitable form, size and construction to perform its function of supporting the element of the machine on a bench.

1 designates the carriage for holding the bundle of slats S to be slotted at S', as the slats of Venetian blinds. 2 designates a carriage or head in which is mounted a rotating spindle 3 having a chuck 4 for supporting a rotating cutting and boring tool 5, this carriage having laterally extending brackets 6 which are mounted on and fixed to upright guide rods 7, slidable through ways or guide openings in a base block 8 suitably mounted on a bench or table 9. The guide rods 7 are tubular and extend downwardly below the table 9. An electric motor 11 is carried by the lower ends of the guide rods. The shaft 12 of the motor 11 is connected to the rotating spindle 3 by motion-transmitting means, as a belt 13 running over a pulley 14 on the shaft 12 and over a pulley 15 on the end of the spindle 3 remote from the cutter 5. The motor is pivoted at 16 to a bracket 17 on one of the tubular rods 7 in order to have an up and down pivotal movement against a buffer or cushion spring 18 between the motor and the other tubular rod 7.

The motor is mounted in a carriage, as a sling or cradle 11ª (Figures 1 and 7) illustrated as consisting of a plurality of arcuate straps, rods or cross bars 11ᵇ and brackets 11ᶜ, 11ᵈ secured to the ends of the straps, rods or cross bars. One of the rods 7 is provided with a head 17 clamped thereon and pivoted at 16 to the bracket 11ᶜ. The other rod or tube 7 is provided with a head 10 adjustable axially in the lower end thereof and held in adjusted position by a clamp 10ᵃ, the rod or tube being split at its lower end to permit contraction on the head 10 under the clamping action. A rod 10ᵇ extends axially through the head 10 and has a bracket 10ᶜ pivoted at 10ᵈ to one end of a link 10ᵉ, the other end of which is pivoted at 10ᶠ to the bracket 11ᵈ. A buffer spring 18 is interposed between the head 10 and the bracket 10ᶜ and a buffer spring 18ᵃ is interposed between the head 10 and an abutment 18ᵇ on the upper end of the rod 10ᵇ. The spring 18ᵃ is of greater strength than the spring 18, as it opposes not only the spring 18 but the weight of the motor. The springs dampen the vibration or dance of the motor when running at high speed. The head 10 is adjusted in the tube 7 to properly tension the belt 13 and the clamp 10ᵃ tightened. The springs permit give and take during variations in the pull of the belt by permitting the motor to shift slightly about the pivot 16, and the two buffer springs acting against each other eliminate vibrating or dancing of the motor.

The slat holding carriage 1 is in the form of a vise having a fixed jaw 19 and a jaw 20 movable toward and from the fixed jaw, the fixed jaw having a base portion 21 formed with guide openings 22 for receiving tubular guide rods 23 projecting horizontally from the base block 8. The movable jaw 20 is mounted to move along suitable guides or ways 24 on the base portion 21. The movable work carriage or vise 1 is shiftable in a direction axially of the cutter 5 to cause the cutter to bore through the slats clamped in the vise, and this movement is against the action of one or more returning springs 25 interposed between the base block 8 of the frame and the base portion 21 of the vise. The clamping movement of the jaw 20 is against suitable retracting springs 20ᵃ.

In the illustrated embodiment of the invention, the vise or work carriage 1 is shiftable toward and from the cutter 5 supported by the tool carriage 2, and the tool carriage 2 is shiftable radially relatively to the axis of the cutter 5, and in a direction widthwise of the slats being slotted, and the vise or work carriage 1 has a slight reciprocating operation during the slot cutting movement of the tool carriage 2. The movable jaw 20 is formed with a recess or clearance 5ᵃ for the end of the tool 5.

The means for operating the jaw 20 of the vise or work carriage 1 and effecting the movement of the carriages 1, 2 comprises an operating lever 26 mounted on a shaft, as a tubular shaft 27 mounted in suitable bearings or bosses 28 on a block 28ᵃ supported on the rods 23. The block 28ᵃ is shown as in the form of a split clamp and clamped on the outer ends of the rods 23. The lever 26 is provided with radial arms 31 and 32 and also with a handle 26ᵃ, the arm 31 extending toward the vise or work carriage 1 and the arm 32 extending at an angle to the arm 31. The lever is connected to the movable jaw 20 to clamp it relatively to the fixed jaw 19 of the work carriage or vise 1, by a link 33 pivoted at one end at 34 to the arm 31 and at its other end at 35 to the movable jaw 20 of the vise or work carriage 1. The link 33 and arm 31 form a toggle normally arranged in folded position, as shown in Figure 1, and movable toward but not into straightened position to move the jaw 20 against the slats or work S in the carriage 1 and clamp the work between the jaws 19 and 20. Continued movement of the lever 26 downwardly into the position shown in Figure 3 feeds the work carriage 1 as a unit against the rotating cutter 5, so that the cutter bores through the slats S, as shown in Figure 3, with the link 33 and arm 31 into a position just short of fully straightened or dead center position. Continued movement downwardly of the operating lever 26 actuates the tool carriage 2 downwardly into the position shown in Figure 4, causing the rotating cutter to rout out the slots S' in the slats S. During this slotting operation, the link 33 and the arm 31 with the lever 26 move from the position shown in Figure 3 to that shown in Figure 4 in which the link and arm have moved into and beyond straightened or dead center position to above straightened position, so that the pivot 34 moves in an arc and in so doing slightly reciprocates the carriage 1 relatively to the cutting tool 5. The purpose of such reciprocation is to prevent the cutting of grooves by the abrading action of the varnish coatings in the tool, while the slotting operation is being performed. The slats are varnished and the edges of the varnish in the slots form lines of abrasive which otherwise would cut into the tool grooving it. The slight reciprocation distributes or avoids localizing this abrading action.

The motion-transmitting means between the lever 26 and the tool carriage 2, to move the latter vertically during the slotting operation, includes a lost-motion connection of sufficient extent to permit the work carriage or vise 1 to be fed axially into the cutter 5 sufficient distance to bore the straight hole through the slats, as shown in Figure 3, before the slotting operation begins. The motion-transmitting means here shown comprises a lever 36 pivoted between its ends at 37 to the base block 8, a link 38 pivoted at 39 at one end to one arm of the lever 36 and its other end at 40 to the tool carriage 2, a link 41 pivoted at one end at 42 to the other arm of the lever 36, and at its other end at 43 to one end of a lever or link 44, the other end of which lever or link 44 is pivoted at 45 to the arm 32 of the operating lever 26. The lever or link 44 is provided with an abutment 46 intermediate of its ends thereof which coacts with an abutment 47 pivoted at 48 to the link 41 intermediate of the ends of the link 41, the abutment 47 having a guide rod 49 on which the abutment 46 slides. The abutment 46 is adjustable axially relatively to the lever, and as here shown, threads through a transverse bore in a spindle 50 carried by the lever or link 44. The lever or link 44 is of double construction or bifurcated, and the spindle 50 is mounted between the bifurcations to have a rocking action. When the operating lever 26 and parts operated are in their starting position, as shown in Figure 1, the abutment 46 is spaced from the abutment 47. When the lever 26 is initially operated, the movable jaw 20 of the work carriage or vise 1 is moved to clamp the work S; and then the vise or work carriage is shifted into the position shown in Figure 3. During this movement, the space or lost motion between the abutment 46 and the abutment 47 is taken up. These abutments constituting a lost-motion connection. Thereafter during further movement of the lever 26 and parts operated thereby from the position shown in Figure 3 to that shown in Figure 4, the abutment 46 pushing against the abutment 47 moves the link 41 and lever 36 into the position shown in Figure 4 and the movement of the lever 26 causes the tool carriage 2 to be pulled downwardly to effect the cutting of the slots S'. When the lever 26 is restored to its starting position, all parts operated thereby are restored to their starting position. During the movement of the operating lever 26 from starting position (Figure 1) to the intermediate position shown in Figure 3, the lever or link 44 moves about the point 43, as a fulcrum, and thus causes the abutment 46 to take up the lost motion between it and the abutment 47. However, continued movement of the lever 26 from the position shown in Figure 3 to that shown in Figure 4, causes the lever 44 to move rectilinearly and hence the abutment 46 to thrust against and actuate the abutment 47 and the link 41 to the left, from the position shown in Figure 3 to that shown in Figure 4. The downward movement of the tool carriage 2 by the lever 36 is against the action of compression springs 51, each interposed between the brackets 6 and the base block 3 (Figures 1 and 2).

In order to adjust the vertical movement of the tool carriage 2 and cutter 5 to cut slots of predetermined length, means is provided for determining the vertical throw of the tool carriage 2. This means is shown as an adjustable stop shoulder 54 threading on a stud 55 extending upwardly from the base block 8 adjacent the tool carriage 2 for coacting with a laterally extending lug 56 on one of the brackets 6. The stop 54 is adjusted to the proper place along the stud 55, in order to stop the vertical movement of the carriage 2. This lug 56 moves between the adjustable stop 54 and a similar adjustable stop 57 on the upper portion of the stud 55. These two stops may be adjustable along the slot stud 55 to properly locate the slot S' in the slats S.

In the usual operation of machines for slotting Venetian blind slats, two lengths of slots are used, and for the purpose of quickly adjusting the machine to these two lengths of slots, the machine is provided with a gage 58 (Figure 2) pivoted on the upper side of the tool carriage 2 at 59 and shiftable into a position overlying the lug 56. When it is in such position, a short slot will be cut, and when out of such position, a long slot will be cut. The stop 54 and the lug 56 are provided with suitable cushions or washers 60, 61 of cushioning material. The machine is provided with a suitable adjustable gage 62 carried by the base block 8 against which the ends of the slats are abutted, in order to locate the slots a predetermined distance from the ends of the slats.

In Figure 5, two machines are mounted on the bench in order to cut the slots S' in opposite ends of the bundle of slats at the same time. These machine have a single operating handle 26ª, and one of the machines is slidable along guide rods, as tubular guide rods 64, extending through guide openings 65 in the base block 8 thereof, and fixedly mounted in similar guide openings 66 in the base block 8 of the stationary machine.

In Figure 5, A designates the stationary machine, and B the adjustable machine slidable along the guide rods 64. It is adjustable along the guide rods by means of a feed screw 67 having a handle 68 on the end thereof adjacent the machine A. The operating levers 26 thereof are mounted on a tubular shaft 27ª mounted in the frames or carriages 28 of both machines. A tubular shaft 27ª is applied of the proper length for the desired spacing of the machines A and B.

The handle 26ª is applied to the lever 26 of machine A only. In order to determine readily the spacing of the machines the proper distance apart, a flexible spring tape 69 is provided which normally winds on a spring reel 70 in a casing 71 on the machine A and is secured at its other end at 72 to machine B. Thus, upon turning of the feed screw 66 and taking a reading on the tape at the pointer 73, the operator may readily set the machine B the required distance from machine A. When the machines are moved toward each other, the tape winds up on the spring reel.

In operation, a bundle of slats is arranged edgewise in the work carriage 1 between the jaws 19, 20 with like ends of the slats against the gage 62. The handle 26ª is then operated, first bringing the jaw 20 against the bundle of slats S, thereafter moving the work carriage 1, that is, the jaws 19, 20 as a unit, toward the cutter 5, so that the cutter bores a hole through the slats. Then upon continued movement of the handle 26ª, the tool carriage 2 is moved downwardly, moving the cutter 5 radially while it is being rotated, thus cutting the slots S', and during the slot cutting operation, the work carriage 1 is reciprocated to prevent the formation of grooves being cut by the varnish on the slats which acts as an abrasive, the reciprocation being effected by the movement of the toggle links 31, 32 from the position shown in Figure 1 to that shown in Figure 4. The springs 25 are strong enough to cause the fixed jaw 19 to follow up the movable jaw 20, when the movable jaw 20 is re-feeding to the right, during this reciprocating action.

What I claim is:

1. In a machine for slotting slats, the combination of a work carriage for the slats, a carriage for a rotating cutter, means for rotating the cutter, and means including a single operating member having an operating movement in one widthwise direction, and motion-transmitting means operated thereby operable to effect successive relative movement of the carriages first in a direction axially of the cutter and transversely of the slats in the work carriage in the direction of the thickness of the slats and second in a direction radially of the cutter and widthwise of the slats, and operating to effect a slight relative reciprocating movement of the carriages during the second of said successive movements.

2. In a machine for slotting slats, the combination of a work carriage for holding a plurality of slats standing flatwise against each other, a tool carriage for a rotating cutter, means for rotating the cutter, the work carriage including opposing jaws, one of which is movable toward and from the other to clamp the slats, means including an operating member and motion-transmitting means operated thereby operable to successively clamp the movable jaw on the slats, feed the slat carriage axially against the cutter, and feed the tool carriage radially relatively to the axis of the cutter.

3. In a machine for slotting slats, the combination of a work carriage for holding a plurality of slats standing flatwise against each other, a tool carriage for a rotating cutter, means for rotating the cutter, the work carriage including opposing jaws, one of which is movable toward and from the other to clamp the slats, means including an operating member and motion-transmitting means operated thereby operable to successively clamp the movable jaw on the slats, feed the work carriage axially against the cutter, and shift the tool carriage radially relatively to the cutter, and reciprocate the work carriage slightly during such radial movement.

4. In a machine for slotting slats, the combination of a work carriage for holding a plurality of slats standing flatwise against each other, a tool carriage for a rotating cutter, means for rotating the cutter, the work carriage including opposing jaws, one of which is movable toward and from the other to clamp the slats, a returning spring for resisting the movement of the work carriage toward the cutter, an operating lever having a radial arm, a link pivoted at one end to said arm and at its other end to the movable jaw, said arm and link constituting a toggle normally arranged in folded position and movable toward straightened position to clamp the movable jaw, and feed the work carriage to the cutter against the action of the spring, and into and beyond straightened position to effect a slight reciprocating movement of the work carriage, and motion-transmitting connections between said lever and the tool carriage to shift the same radially relatively to the axis of the cutter including a lost-motion connection arranged to be taken up after the work carriage has been fed a maximum distance toward the cutter.

5. In a machine for slotting slats, the combination of a work carriage for holding a plurality of slats standing flatwise against each other, a tool carriage for a rotating cutter, means for rotating the cutter, the work carriage including opposing jaws, one of which is movable toward and from the other to clamp the slats, a returning spring for resisting the movement of the work carriage toward the cutter, an operating lever having a radial arm, a link pivoted at one end to said arm and at its other end to the movable jaw, said arm and link constituting a toggle normally arranged in folded position and movable toward straightened position to clamp the movable jaw and feed the work carriage to the cutter against the action of the spring, and into and beyond straightened position to effect a slight reciprocating movement of the work carriage, a second lever pivoted between its ends and connected at one end to the tool carriage, a link pivotally connected to the other end of the second lever, a third lever pivotally connected to the operating lever and to the last-mentioned link, and a lost-motion connection between the last link and the third lever operable to be taken up by the lost motion when the operating lever has been operated far enough to shift the work carriage a maximum distance toward the cutter.

ELMER P. SACREY.